US00RE37306B1

(19) United States
(12) Reissued Patent
Shirai et al.

(10) Patent Number: US RE37,306 E
(45) Date of Reissued Patent: Aug. 7, 2001

(54) AUTOMOBILE TIRE

(75) Inventors: Kenichi Shirai; Masahiro Ishida; Tetsuya Kuze; Toshihiko Suzuki, all of Kanagawa-ken (JP)

(73) Assignee: Yokohama Rubber Co., Ltd., Tokyo (JP)

(21) Appl. No.: 29/107,470

(22) Filed: Jun. 22, 1999

Related U.S. Patent Documents

Reissue of:
(64) Patent No.: Des. 392,229
Issued: Mar. 17, 1998
Appl. No.: 29/060,588
Filed: Oct. 1, 1996

(30) Foreign Application Priority Data

Mar. 4, 1996 (JP) ..... 8-9223

(51) LOC (7) Cl. ..... 12-15
(52) U.S. Cl. ..... D12/147
(58) Field of Search ..... D12/136, 138, D12/140–151; 152/209 D, 209 R, 209.15, 209.22

(56) References Cited

U.S. PATENT DOCUMENTS

D. 283,499 * 4/1986 Hammond ..... D12/146
5,358,022 * 10/1994 Glover et al. ..... 152/209.15
5,609,699 * 3/1997 Himuro ..... 152/209.22

* cited by examiner

*Primary Examiner*—Robert M. Spear
(74) *Attorney, Agent, or Firm*—Arent Fox Kinter Plotkin & Kahn

(57) CLAIM

The ornamental design for an automobile tire, as shown and described.

DESCRIPTION

FIG. 1 is a front view of the automobile tire, showing the new design, the top plan view and bottom plan view appearing the same as the front view;
FIG. 2 is a rear view of the automobile tire;
FIG. 3 is a right side view of the automobile tire;
FIG. 4 is a left side view of the automobile tire;
FIG. 5 is a fragmentary front view, showing in enlargement the portion 5—5 in FIG. 1; and,
FIG. 6 is a sectional view, taken on line 6—6 of FIG. 5.

1 Claim, 5 Drawing Sheets

Figure 3:
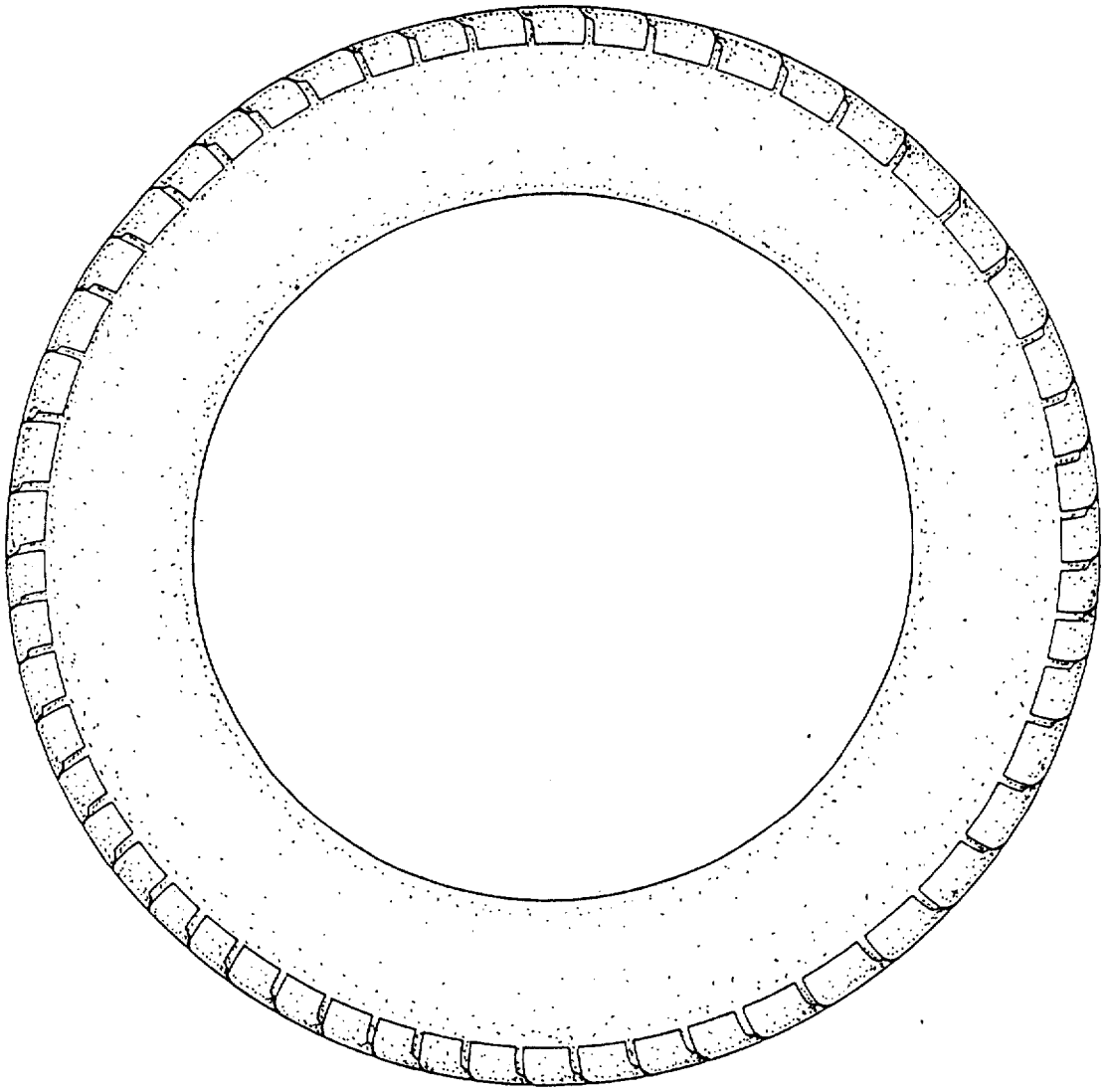
Figure 4:
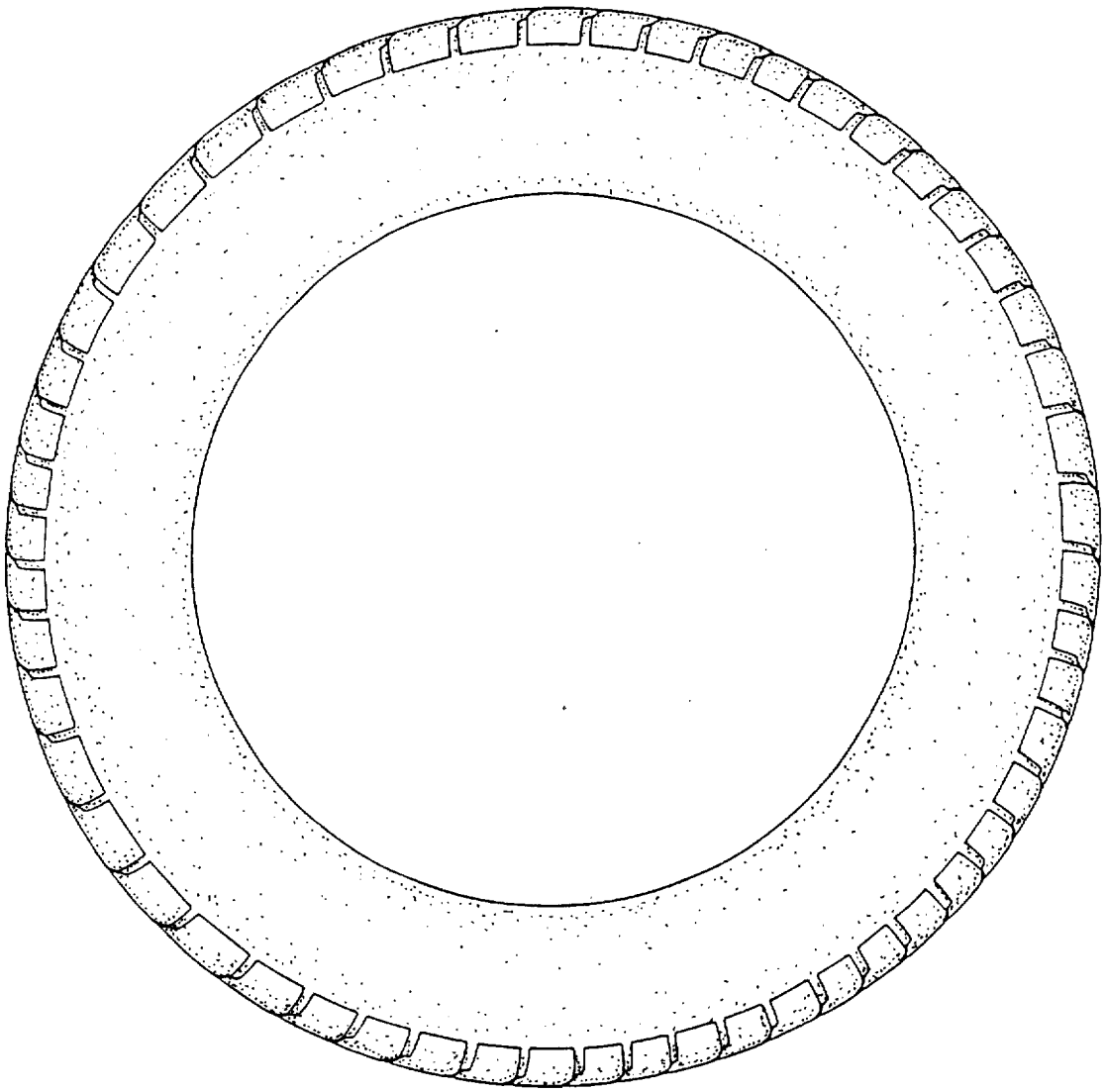
Figure 5:
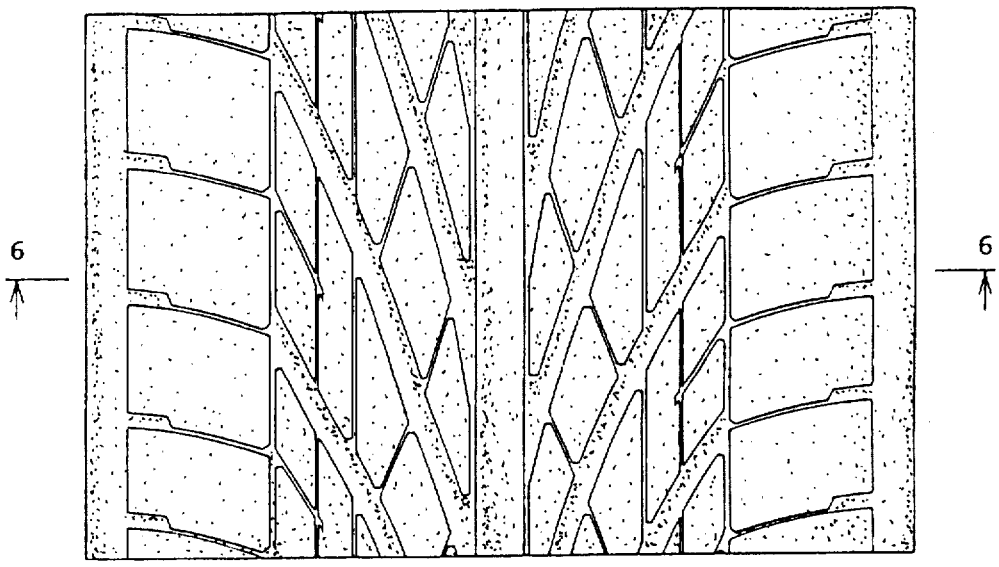
Figure 6:
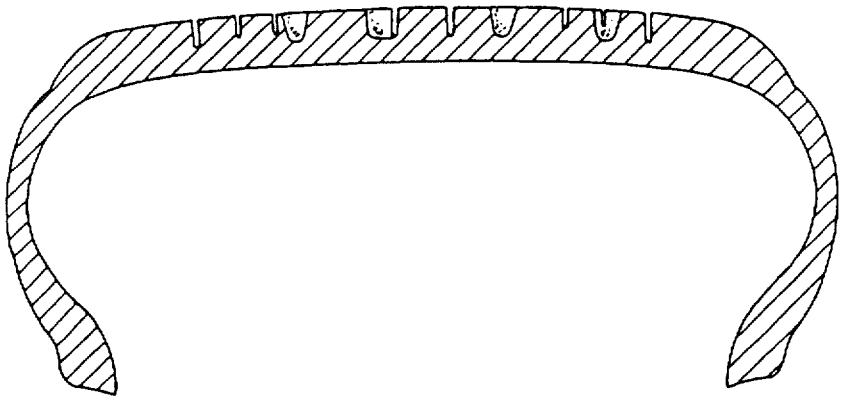

Matter enclosed in heavy brackets [ ] appears in the original patent, but forms no part of this reissue; matter printed in italics indicates the additions made by reissue.

AMENDED

FIG.1 AMENDED
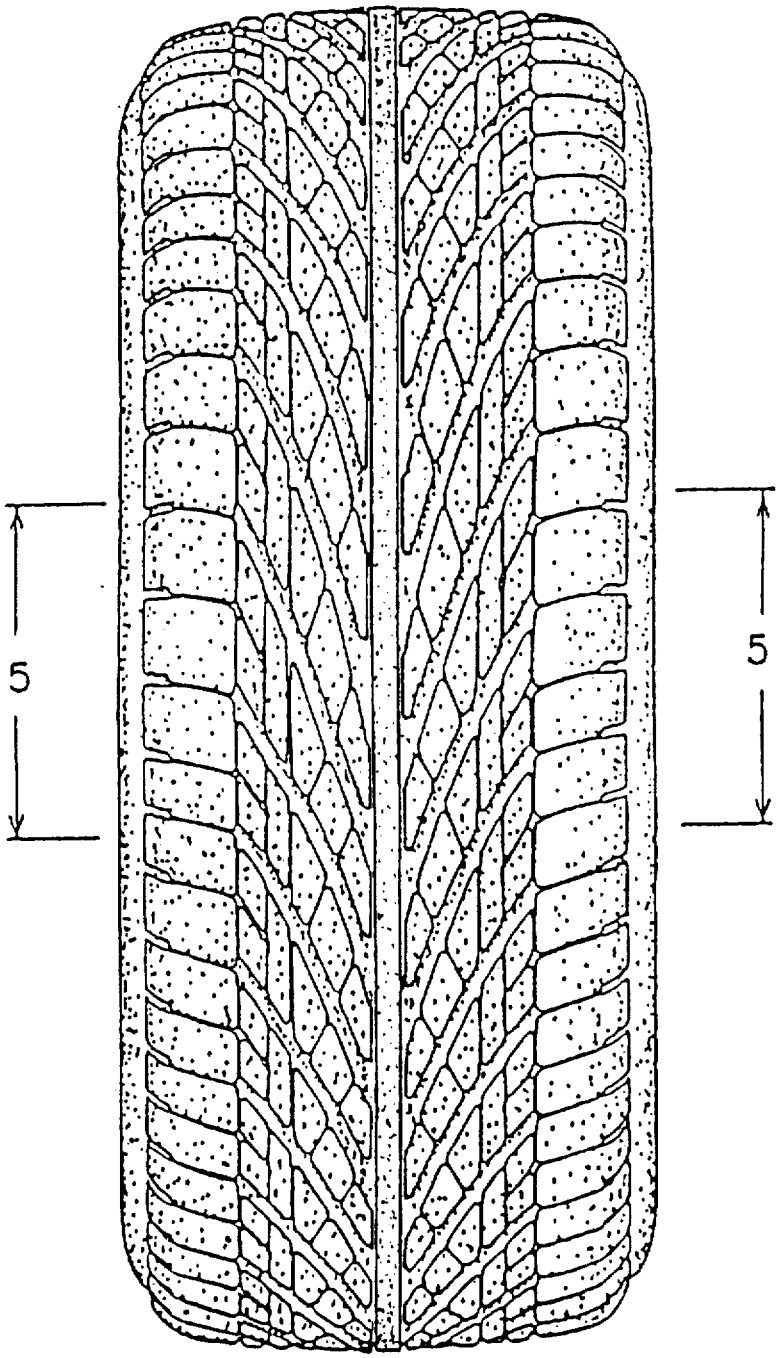

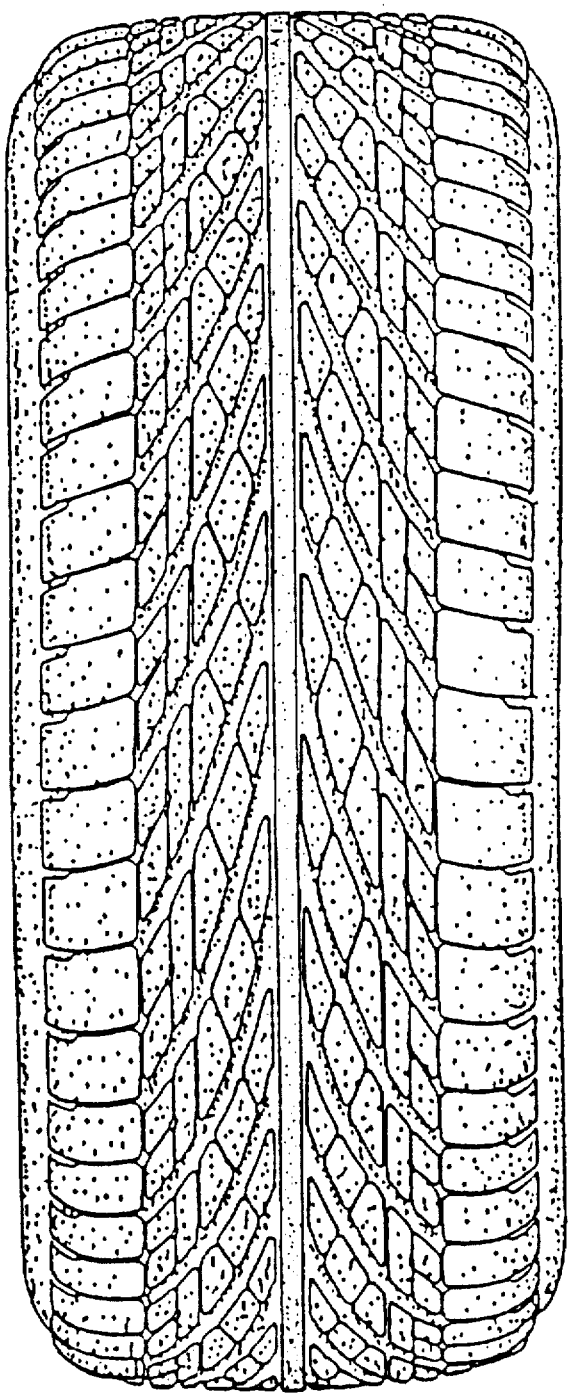

FIG. 2 AMENDED